United States Patent [19]
Saeki

[11] Patent Number: 5,430,810
[45] Date of Patent: Jul. 4, 1995

[54] REAL TIME IMPLEMENTATION OF THE HOUGH TRANSFORM

[75] Inventor: Takao Saeki, Ann Arbor, Mich.

[73] Assignee: Imra America, Inc., Ann Arbor, Mich.

[21] Appl. No.: 78,071

[22] Filed: Jun. 18, 1993

Related U.S. Application Data

[63] Continuation of Ser. No. 616,251, Nov. 20, 1990, abandoned.

[51] Int. Cl.⁶ .......................................... G06K 9/36
[52] U.S. Cl. ................... 382/281; 382/199; 364/424.02
[58] Field of Search ............... 382/1, 8, 41, 22, 27; 364/725, 826, 424.07, 424.02; 358/103; 348/113

[56] References Cited

U.S. PATENT DOCUMENTS

| | | | |
|---|---|---|---|
| 4,601,055 | 7/1986 | Kent | 382/49 |
| 4,613,269 | 9/1986 | Wilder et al. | 364/513 |
| 4,618,989 | 10/1986 | Tsukune et al. | 382/25 |
| 4,707,647 | 11/1987 | Coldren et al. | 382/28 |
| 4,731,860 | 3/1988 | Wahl | 382/41 |
| 4,809,346 | 2/1989 | Shu | 382/49 |
| 4,868,752 | 9/1989 | Fujii et al. | 382/41 |
| 4,906,099 | 3/1990 | Casasent | 356/394 |
| 4,970,653 | 11/1990 | Kenue | 358/103 |
| 5,063,604 | 11/1991 | Weiman | 382/41 |
| 5,086,484 | 2/1992 | Katayama et al. | 382/22 |
| 5,220,615 | 6/1993 | Ishii et al. | 364/725 |

FOREIGN PATENT DOCUMENTS 2-341985 11/1989 European Pat. Off. .
2-361914 4/1990 European Pat. Off. .

OTHER PUBLICATIONS

"Real-Time Optical Hough Transform for Industrial Inspection", *Intelligent Robts and Computer Vision: Algorithms and Techniques*, Richards & Casasent, vol. 1192, 1989.

"A Real-Time Processor for the Hough Transform" *IEEE Transactions On Pattern Analysis And Machine Intelligence*, Hanahara, Maruyama and Uchiyama, vol. 10, No. 1, Jan. 1988.

"A Monolithic Hough Transform Processor Based On Restructuable VLSI", *IEEE Transactions On Pattern Analysis And Machine Intelligence*, Rhodes, vol. 10, No. 1, Jan., 1988.

"Monolithic Processor Performs Histogram, Hough Transforms at 20 MHz", *Computer Design*, p. 91, Mar. 1, 1989.

"The Vote Tallying Chip: A Custom Integrated Circuit" *University of Rochester*, Sher and Tevanian, Nov. 1984.

Primary Examiner—Joseph Mancuso
Assistant Examiner—Jon Chang
Attorney, Agent, or Firm—Burns, Doane, Swecker & Mathis

[57] ABSTRACT

In accordance with the present invention, a method and apparatus are disclosed for real-time processing of digitized image data using an implementation of the Hough transform. More specifically, frames of image data are received and stored as pixel arrays in a rectangular coordinate system. Pixels having values above a predetermined intensity are subsequently transformed into polar coordinate space. Maximum meeting points of curves associated with all pixels which have been transformed into polar coordinate space are then identified using a real-time, hardware implementation of a neuro-Hough transform for analyzing windowed portions of the digitized image. The present invention identifies maximum meeting points in polar coordinate space using a neuro-Hough transform implemented as a single chip.

32 Claims, 11 Drawing Sheets

BINARY EDGE

ORIGINAL IMAGE

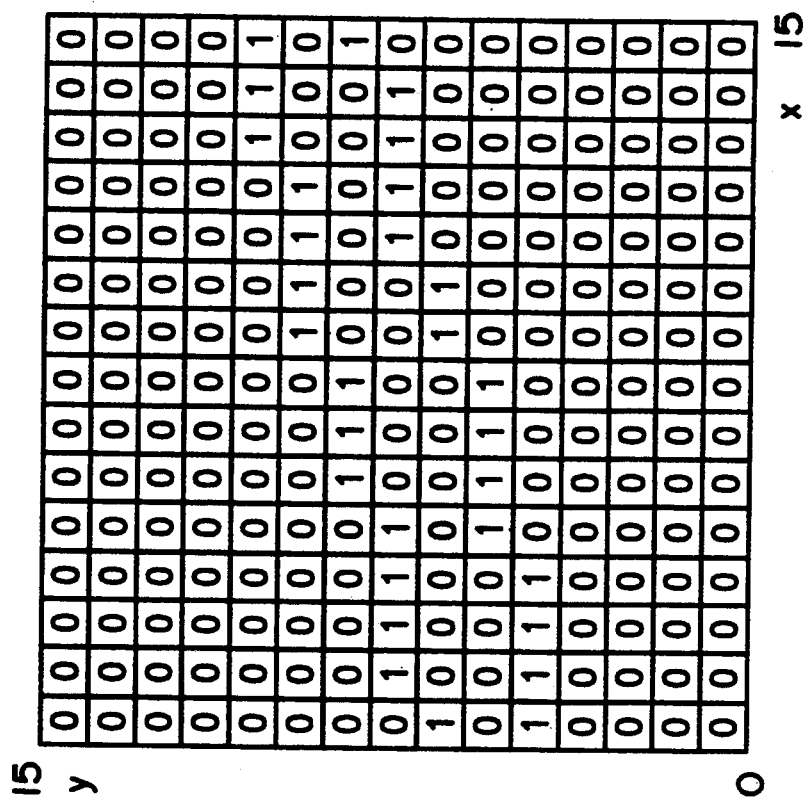
FIG. 2d WINDOW DATA
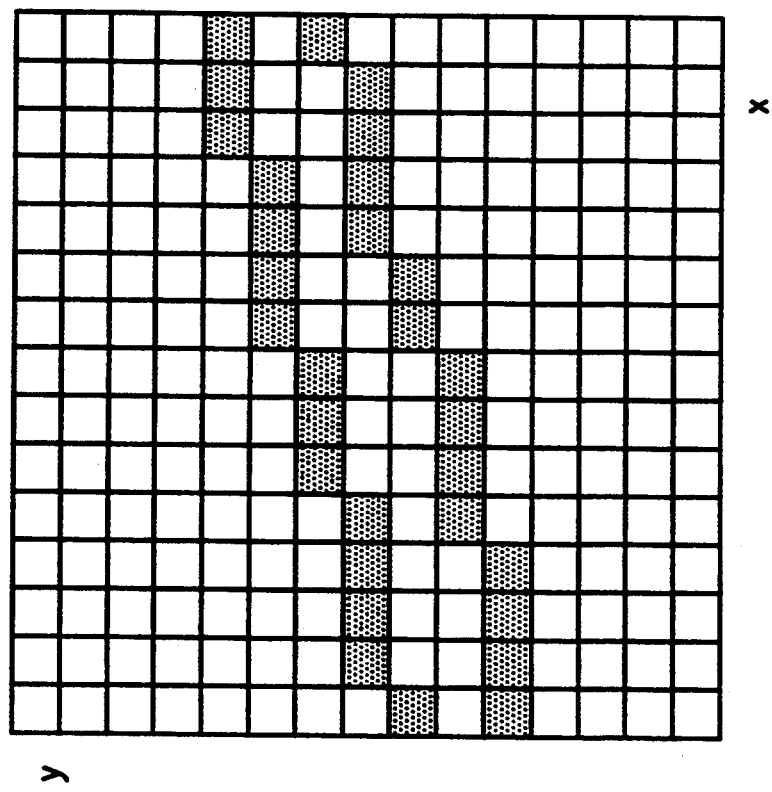
FIG. 2c SMALL WINDOW

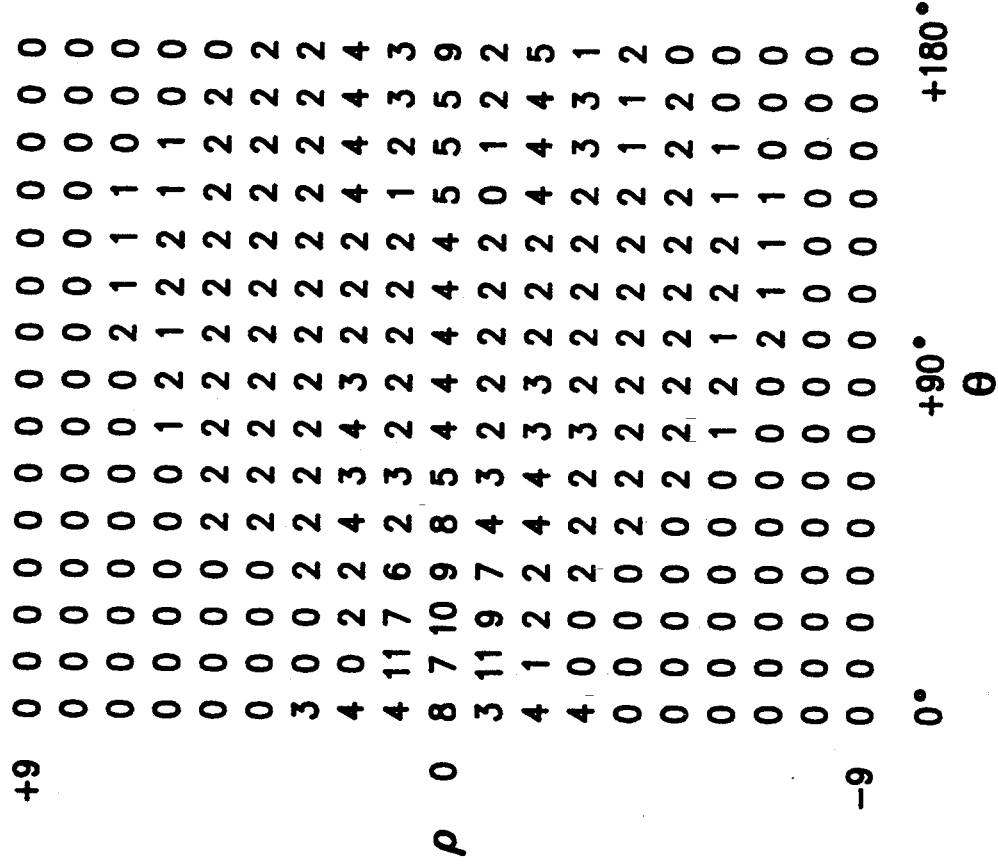

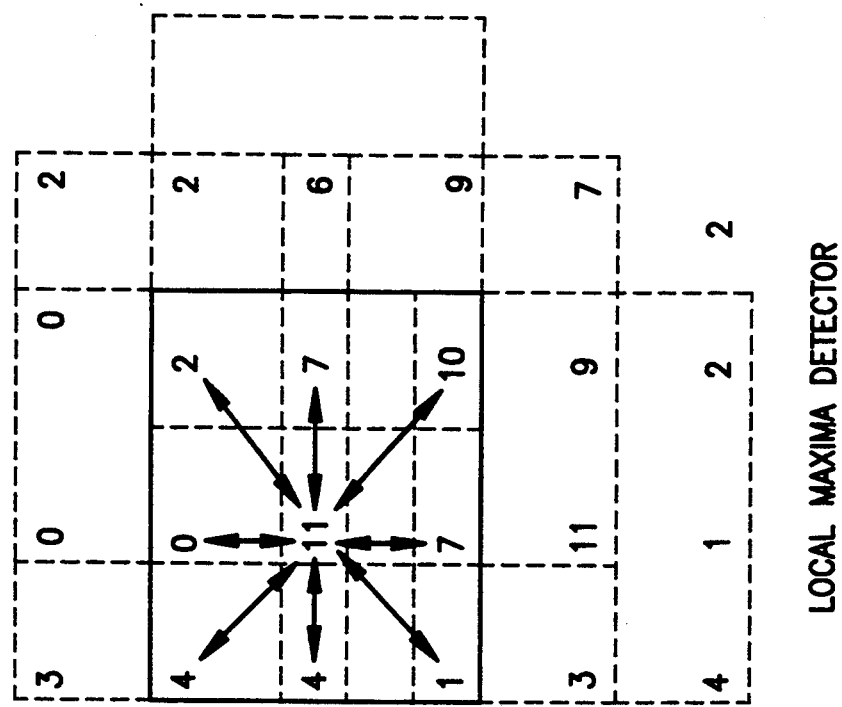
FIG. 3b DETECT LOCAL MAXIMA MEETING POINT
FIG. 3c LOCAL MAXIMA DETECTOR

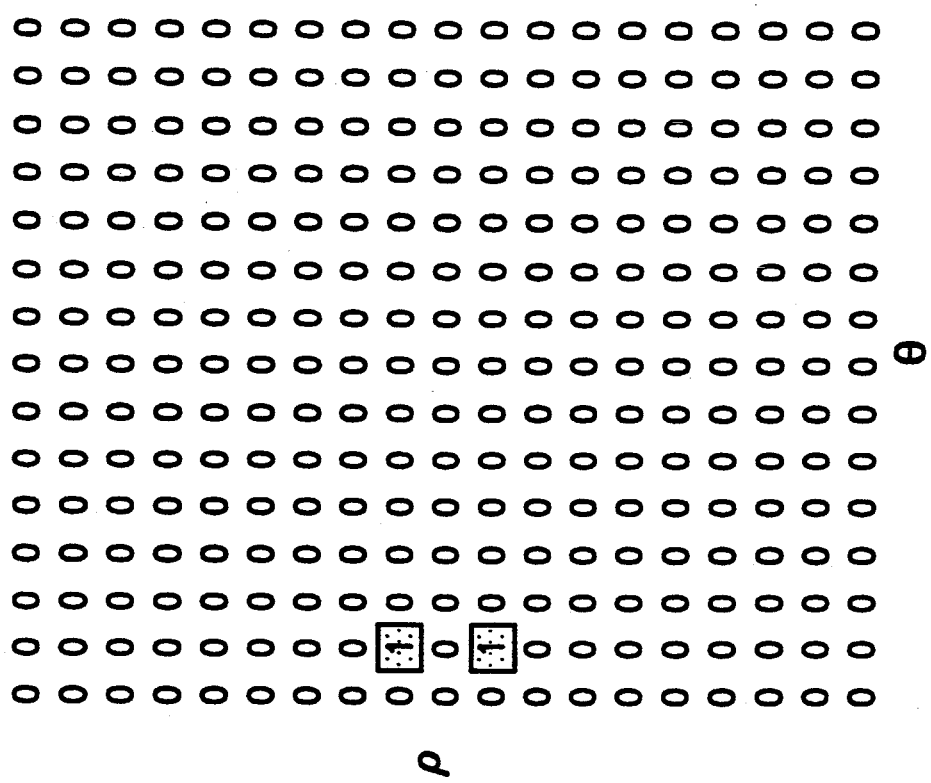
FIG. 3e MAX MEETING POINTS
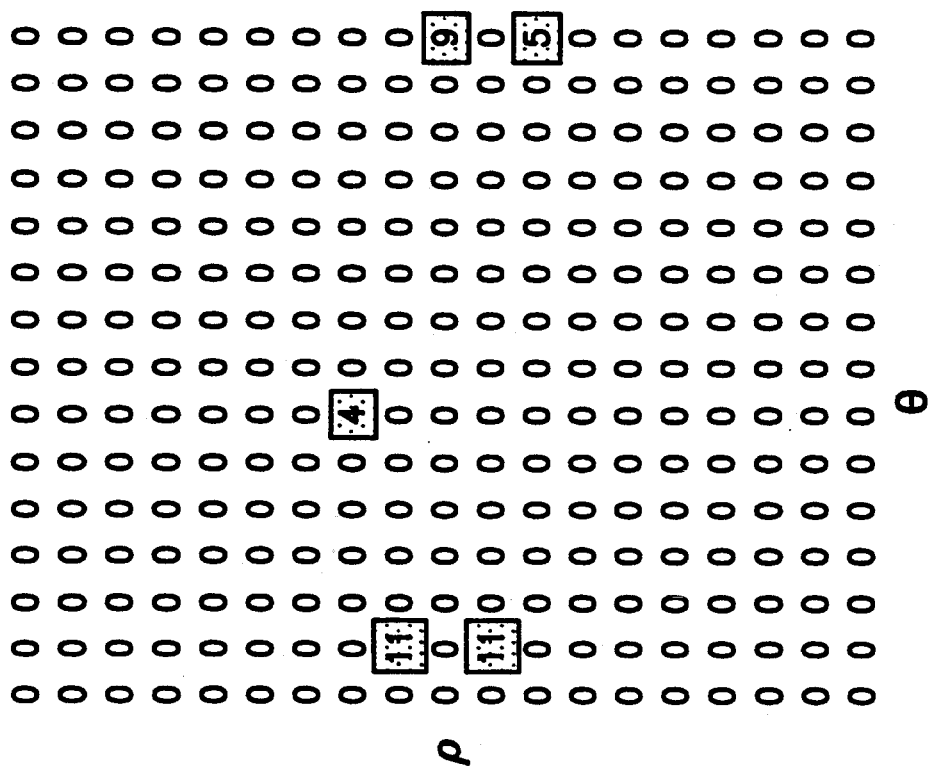
FIG. 3d LOCAL MAXIMA MEETING POINTS

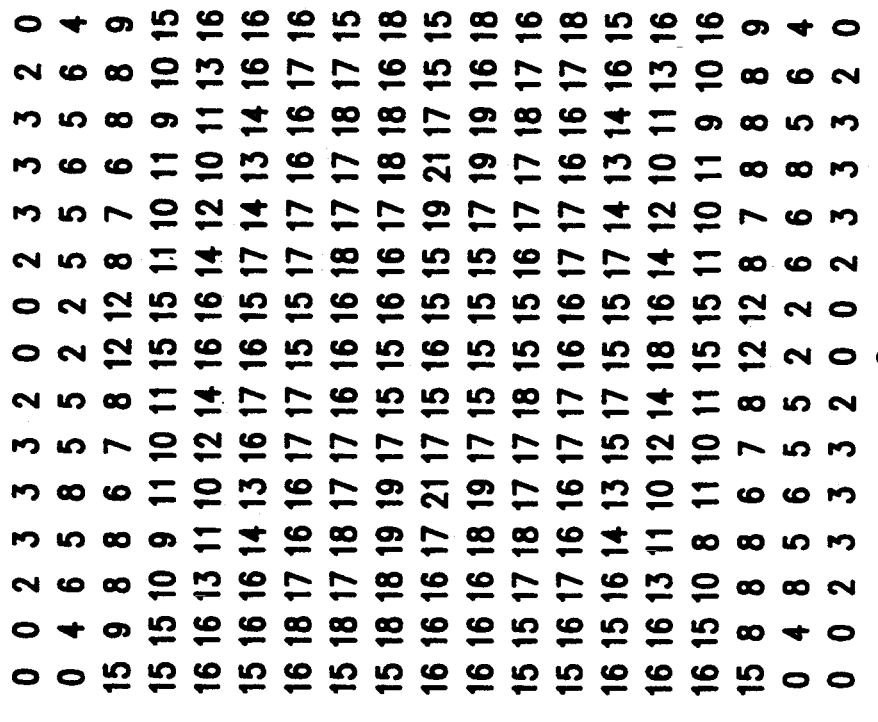

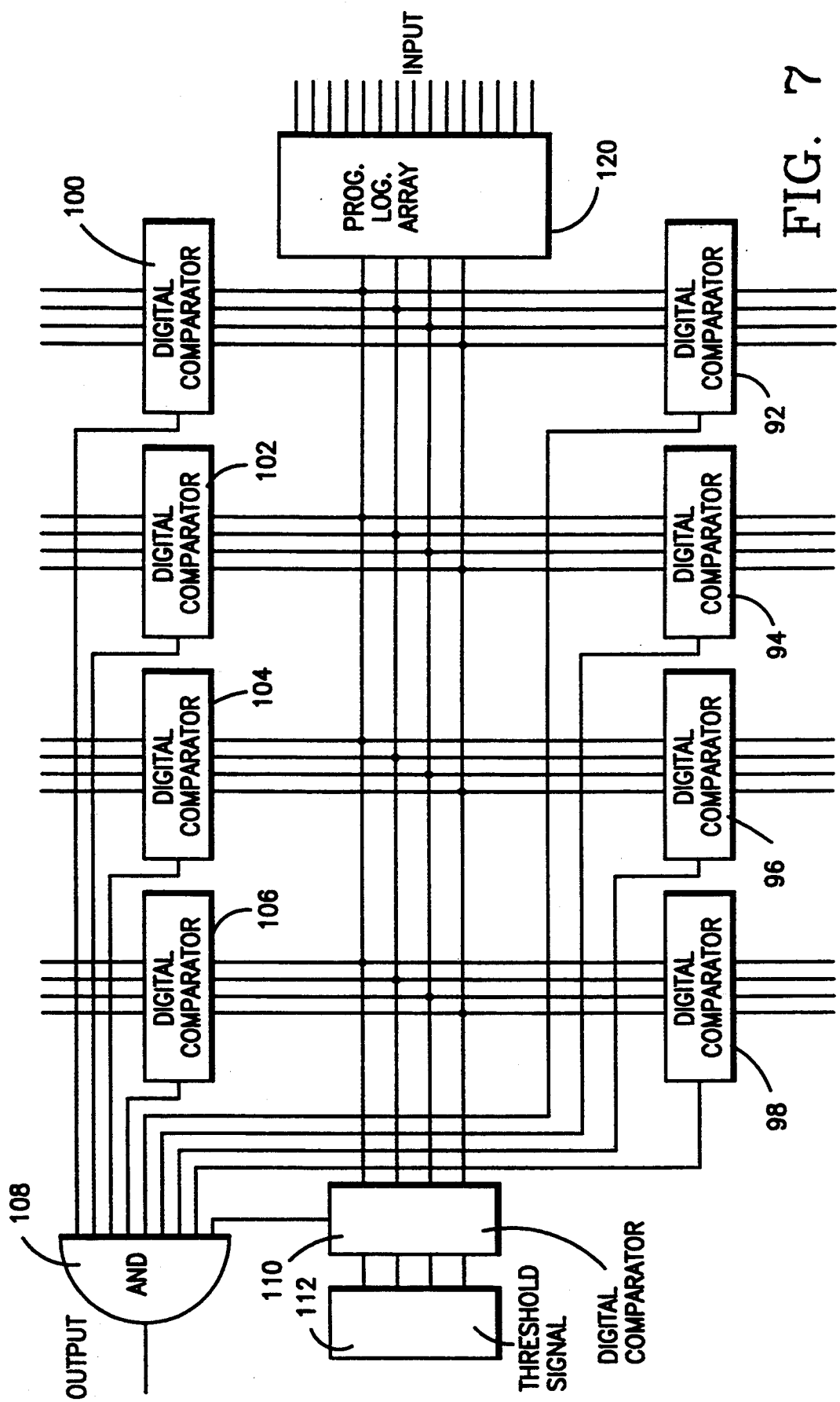

REAL TIME IMPLEMENTATION OF THE HOUGH TRANSFORM

This application is a continuation of application Ser. No. 07/616,251, filed Nov. 20, 1990 now abandoned.

BACKGROUND OF THE INVENTION

The present invention relates generally to image recognition, and more particularly to image recognition via use of the Hough transform.

The Hough transform represents a known technique which has achieved widespread use in image recognition systems. For example, U.S. Pat. No. 4,868,752 (Fujii et al) discloses an automatic working vehicle control system having a boundary detecting system which employs the Hough transform. As described therein, a portion of a working area forward of the vehicle is photographed and a variable density image is produced according to edge data derived from the brightness level of image pixels.

Transition points in the image where dense portions of the image change into light portions are identified to detect a boundary line. The boundary line distinguishes a dark, untreated area (e.g., if the vehicle is a lawn mower, the untreated area corresponds to uncut lawn) and a treated area (e.g., cut lawn) along which the vehicle is to be guided. The Hough transform is employed to avoid false detection of noise (due, for example, to bright spots which occur in the untreated area and dark spots which occur in the treated area) as the boundary along which the vehicle is to be guided.

More particularly, as shown in FIG. 13 of U.S. Pat. No. 4,868,752, the Hough transform can detect a straight line representing an image boundary despite the presence of surrounding noise in the image. Basically, the Hough transform acts upon pixel values of a digitized image. The Hough transform assigns a locus curve to the (x,y) coordinates of each pixel value having an intensity which corresponds to that of a boundary line condition. The locus curve for each of these pixels corresponds to a polar coordinate transformation of the (x,y) coordinates for each such pixel. A straight line used to represent the boundary line in the image is then obtained by finding the polar coordinates of a point where the curves representing the loci concentrate.

Although many forms of the Hough transform have been used in a variety of systems, this transformation is most often implemented in software and involves significant processing time. More than one minute is typically required to process each frame of image data using a software implementation of the Hough transform. Further, even where specialized hardware is used to enhance the processing speed, real time processing at a typical frame rate of image data acquisition (i.e., 30 frames of image data per second) has not been achieved.

For example, the document entitled "A Real-Time Processor for the Hough Transform", *IEEE Transactions on Pattern Analysis and Machine Intelligence*, Hanahara, Keishi et al., Vol. 10, No. 1, January 1988 relates to dedicated straight line detection hardware which uses the Hough transform. More specifically, an experimental model which exploits parallel processing and pipelining techniques is described. For a gray-scale picture with 1024 feature points, total processing time for an image using standard TTL circuits is described as being 0.79 seconds, not including time for clearing a histogram memory used during processing.

In another document entitled "A Monolithic Hough Transform Processor Based on Restructurable VLSI", *IEEE Transactions On Pattern Analysis and Machine Intelligence*, Rhodes, F. Matthew et al., Vol. 10, No. 1, January 1988, an implementation of a Hough transform processor using a wafer-scale integration technology, restructurable VLSI, is described. A basic implementation for a typical line extraction is described as being performed using a traditional Hough transform implementation.

In European Patent Application No. A2-361,914 to Nakayama et al., a specialized implementation of the Hough transform is described for judging a contour of a road by processing data of an image taken of the road by a camera. Processing is apparently performed using known Hough transform techniques for extracting straight lines in first and second regions of a digitized image. However, no specific hardware which would permit real-time implementation of Hough processing for the potentially numerous edges present in either or both of the first and second regions shown, for example, in FIGS. 16 and 17 is disclosed.

Thus, while efforts have been made to enhance the speed of image analysis processing using the Hough transform, versatile implementations having a potential processing speed which can exceed that of typical digital image data acquisition are not presently available. Accordingly, it would be desirable to provide an image processor which includes a versatile, real time implementation of the Hough transform.

SUMMARY OF THE INVENTION

In accordance with the present invention, a method and apparatus are disclosed for real-time processing of digitized image data using an implementation of the Hough transform to detect maximum meeting points of binary edge data in a polar coordinate space. More specifically, frames of image data are received and stored as pixel arrays in a rectangular coordinate system. Pixels possessing values indicative of edge data within a given partition, or window, of the digitized image are subsequently transformed into polar coordinate space. Maximum meeting points of curves associated with pixels transformed into polar coordinate space are then identified using a real-time, hardware implementation of a neuro-Hough transform for analyzing the windowed portion of the digitized image.

BRIEF DESCRIPTION OF THE DRAWINGS

Other objects and advantages of the present invention will become more apparent from the following detailed description of preferred embodiments as described with reference to the drawings wherein:

FIGS. 2(a)–(d) show the digitization of an image into a frame of pixel values from which a given windowed portion is identified for subsequent processing;

FIGS. 3(a)–(e) show an analysis of the FIG. 2 digitized image using a neuro-Hough transform;

FIGS. 5(a)–(c) show a determination of threshold values for use in the FIG. 4 neuro-Hough processor; and, FIGS. 6 and 7 show additional exemplary embodiments of a neuro-Hough processor.

DETAILED DESCRIPTION OF THE PREFERRED EMBODIMENTS

In the following discussion of preferred embodiments, particular reference will be made to the analysis of image data for real-time control or navigation. It will be appreciated by those skilled in the art, however, that the present invention is equally applicable to any system, whether or not it operates in real-time, wherein analysis of image data for recognition of characteristic features is desired.

Figure 1:
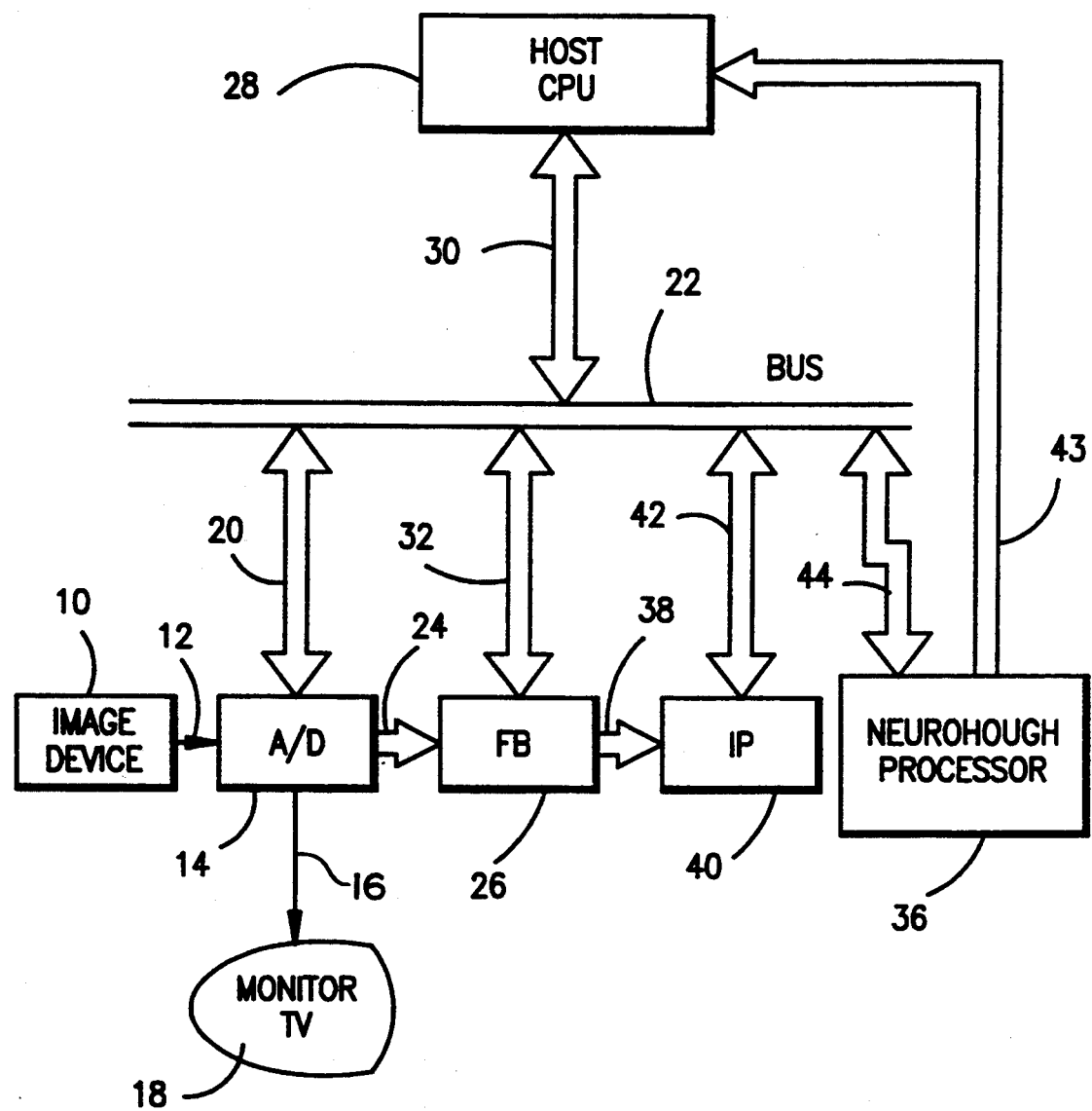
FIG. 1 is an image acquisition and processing system designed in accordance with the present invention.

A preferred, exemplary embodiment of an image acquisition and processing system is shown in FIG. 1. As shown therein, an image data acquisition means is represented as an image device 10. The image device 10 can, for example, be any known video camera, such as a CCD video camera. An analog output of the video camera 10 is placed onto an output line 12 which is connected with an analog-to-digital converter 14.

The analog-to-digital converter 14 includes an analog output 16 for directing analog image data from the image device to a monitoring means 18, such as a television monitor or CRT. A first digital input/output line 20 of the analog-to-digital converter is connected to a data bus 22 which is, for example, a 16-bit bus. A second digital output line 24 of the analog-to-digital converter is input to a frame buffer 26.

In an exemplary embodiment of the present invention as depicted in FIG. 1, the analog-to-digital converter 14 produces frames of digitized image data. Each frame of digitized image data is, for example, a 512 by 512 pixel array of gray scale image data, with each pixel being represented as an eight bit value. Each digitized frame of image data assembled by the analog-to-digital converter is input and stored in the frame buffer 26. A frame of digitized image data thus represents a frame of analog image data received from the image device 10 and has a total resolution represented by $512 \times 512 \times 8$, corresponding to 2.097152 Mbits of data.

The first digital input/output line 20 of the analog-to-digital converter responds to control signals from a host central processing unit (CPU) 28 which is also connected in known fashion to the data bus 22 via a bi-directional line 30. Status signals from the analog-to-digital converter can also be sent to the CPU as well as to other components of the FIG. 1 system via the digital input/output line 20 and the data bus 22.

Similarly, the frame buffer 26 includes a bi-directional line 32 for sending and receiving control and status signals in known fashion. The frame buffer 26 also includes a digital output 38 for transferring stored frames of image data to an image processor 40.

The analog-to-digital converter 14, the frame buffer 26 and the image processor 40 constitute, for example, a known Series 151 Image Processor available from Imaging Technology Inc., 600 West Cummings Park, Woburn, Mass. For example, where a Series 151 Image Processor is used, the image processor 40 includes a pipelined ALU and a real-time convolver. Further, the bus 22 can be a standard internal 16 bit bus available with the Series 151 Image Processor. An output of the image processor 40 is represented as a bi-directional line 42 for sending and receiving control and status signals to other components of the FIG. 1 system via the bus 22.

Each of the bi-directional lines 20, 30, 32 and 42, and the data bus 22 can, for example, be 16-bit buses. It will be appreciated by those skilled in the art, however, that the actual size of these data lines may, for example, vary with the number of bits used to represent pixel values in the digitized frames of image data.

More particularly, because each pixel of an image data frame is represented by 8 bits in the FIG. 1 exemplary embodiment, the analog-to-digital converter 14, the frame buffer 26, and the image processor 40 need only accommodate 8-bit pixel values. However, the present invention is not limited by the resolution of the FIG. 1 exemplary embodiment. For example, it will be apparent to those skilled in the art that each pixel of a digitized image frame can be represented by any number of bits and the data lines interconnecting the FIG. 1 embodiment modified accordingly. Thus, if 16-bit representation of each pixel were provided, each digital output used to transfer digitized image data could include at least 16 bits for image information.

In operation, the image device 10 detects and acquires image data of an original image, and yields an analog intensity mapping for input to the analog-to-digital converter. The analog-to-digital converter produces digitized frames of gray scale image data such as that shown in FIG. 2(a), for storage in the frame buffer 26. The analog-to-digital converter provides a gray scale value for each pixel of the digitized image. For example, a standard 512 by 512 array of 8-bit pixels can be used to represent the gray scale image of FIG. 2(a).

Figure 2B:
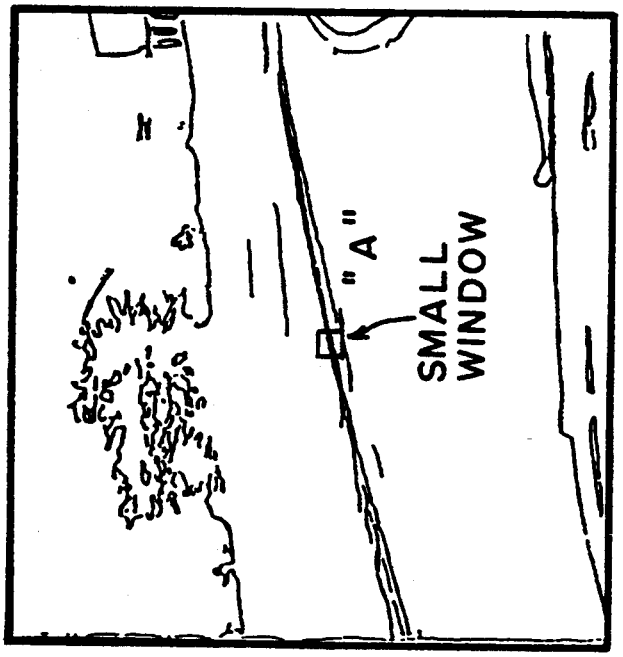
Figure 2A:

Frames of digitized image data are subsequently transferred from the frame buffer to the image processor 40 for conventional real-time image processing in known fashion. For example, a standard edge detection of a digitized image can be performed to produce a 512 by 512 array of binary edge data wherein each pixel is represented by a single bit. That is, all pixel values in the gray scale image of FIG. 2(a) wherein an edge has been detected are represented as a binary 1, while all other pixels values are represented as a binary 0, thus producing a binary edge image as shown in FIG. 2(b). A standard edge detection includes, in an exemplary embodiment, a threshold detection stage and a filtering stage.

More particularly, the threshold detection is performed by comparing each 8-bit gray scale value of the digital image with a threshold. For example, a near mid-range value of all possible gray scale values is selected as the threshold (e.g., for 8-bit representation, a value of 100 is a suitable threshold for the possible pixel values of 0 to 255). Alternately, the threshold value may, for example, be established by a histogram of values associated with previously processed frames of image data. Values above the threshold are assigned a binary "1" and values below the threshold are assigned a binary "0".

The resulting array of binary data is then subjected to a filtering stage wherein a real-time convolution is performed, for example, with a Laplacian filter. That is, a 3 by 3 pixel window having characteristics associated with a Laplacian filter is applied to each value in the array of binary data to improve edge detection. A known 3 by 3 Laplacian filter window includes, for example, a central pixel having a value of "4", with the surrounding bits having alternate values of −1 and 0.

After forming a binary edge frame of image data for the entire digitized image, a small partition, or window "A", as shown in FIG. 2(b) is divided out from the data. In an exemplary embodiment, the small window of binary edge data is defined as a 15 by 15 array of pixel values which includes the central pixels of the 512 by 512 binary edge data array. After the window of central pixels is processed in a manner to be described below, the small window is moved horizontally or vertically to examine another window of binary edge data, this process being repeated until data for the entire 512 by 512 array has been processed.

In FIG. 2(c), a digitized window image corresponding to the 15 by 15 array of binary edge data for the window A of FIG. 2(b) is shown, wherein each pixel value is represented by a single bit. FIG. 2(d) represents the binary edge data which corresponds to the digitized window image of FIGS. 2(b) and 2(c). As can be seen in FIGS. 2(c) and 2(d), each bit of edge data in the digitized window image can be represented by corresponding x and y coordinates values ranging from 1 to 15.

The binary edge data corresponding to the digitized window image is output from the FIG. 1 image processor to a neuro-Hough processor 36 via digital output 42, bus 22 and a bi-directional interface bus 44 (e.g., 16 bit) connected between the processor 36 and the bus 22. Alternately, if the binary edge data from the image processor 40 has been stored in the frame buffer 26, the data is output to the neuro-Hough processor 36 via digital output 32, bus 22 and bus 44. The neuro-Hough processor also includes a bus 43 (e.g., 16 bit) for transferring processed data to the host CPU 28.

The neuro-Hough processor 36 is designed in accordance with the present invention to identify the number of pixel locations in a digitized window image which represent the presence of edge data (i.e., represented by a "1" in FIG. 2(d)) and which transform into a curve that includes a given set of polar coordinates. That is, the neuro-Hough processor 36 will determine the number of curves associated with all (x, y) coordinates represented by a "1" in the digitized window image of FIG. 2(d), which overlap at a given set of polar coordinates, rho and theta.

In a preferred embodiment, the processor 36 represents a hardware implementation of the Hough transform for identifying the number of curves associated with the binary edge data which overlap at each given set of polar coordinates. By identifying those pixel locations in the FIG. 2(d) image having overlapping polar coordinates, the neuro-Hough processor is able to detect the polar coordinates associated with points of maximum overlap referred to herein as local maxima meeting points. From the local maxima meeting points, maximum meeting points can then be determined.

The polar coordinates used to represent curves resulting from the Hough transformation of (x,y) coordinate values are designated by values of rho and theta. As mentioned previously, pixel locations in FIG. 2(d) can be represented by (x,y) coordinate values where the FIG. 2(d) image is considered to be a rectangular coordinate space. The value of rho corresponds to a distance an edge point lies from the center of the digitized window image in FIG. 2(d), and the value of theta corresponds to an angle which exists between the edge point and the horizontal x-axis of the digitized window image in FIG. 2(d).

For each point in the rectangular coordinate space of FIG. 2(d), a curve is generated in polar coordinate space which can have from 1 to 15 sets of associated polar coordinates (i.e., a set of polar coordinates which corresponds to a point in each column of FIG. 3(a)). The binary edge data associated with a line in the FIG. 2(d) array will therefore have associated curves which overlap in at least one polar coordinate location of the FIG. 3(a) polar coordinate space. For example, curves associated with the binary edge data representing a straight line in FIG. 2(d), should ideally have one highest point of overlap in the FIG. 3(a) polar coordinate space. Accordingly, the number of curves which overlap at any given set of polar coordinate values in FIG. 3(a) will typically not exceed 15. Indeed, in most cases the number of overlapping curves at a given polar coordinate location will be less than 15 due to the non-continuous representation of a straight line in the rectangular coordinate space as illustrated, for example, in FIG. 2(c).

After the overlapping polar-coordinates associated with all binary edge data included in the FIG. 2(d) array are determined, a polar coordinate array of data as shown in FIG. 3(a) is obtained. Values of rho and theta are then identified which represent maximum meeting points where the loci of curves representing the edge points extant in the digitized window being processed concentrate. These maximum meeting points have values of rho and theta which are, in an exemplary embodiment, each represented by any number of bits. However, because the values of rho and theta will each typically take on one of 16 values used to represent the polar coordinate space shown in FIG. 3(a), a 4-bit representation for each of these values is adequate. The values are stored in the frame buffer 26 via the output line 44. Alternately, the data can be stored directly in the host CPU 28. Afterwards, the next window of binary edge image data is processed.

The foregoing steps are repeated for each 15 by 15 window of the FIG. 2(b) binary edge image. The total data which is thus stored in the frame buffer or the host CPU by the neuro-Hough processor corresponds to an array of 34 by 34 by (4 bits by 2) by n). Here, the designation ((4-bits by 2) by n) represents that n sets of 4-bit values for rho and theta are stored for each of the 15 by 15 bit windows of the 512 by 512 binary edge image, where n corresponds to the number of lines detected in a given window.

Alternately, only data from those windows determined to include line data can be stored. In this case, each location within the 34 by 34 matrix can be represented as an address including a 6-bit row value and a 6-bit column value. The values of rho and theta can again be represented as ((4-bit by 2) by n) values. Accordingly, the total data stored would be the sum of the (6-bit by 2 plus (4-bit by 2)) by n values, with the first 12 bits identifying the address of the polar coordinates associated with line data.

The stored data is transferred from the frame buffer to the host CPU 28 for subsequent real-time image recognition. This real-time image recognition includes reconstruction of the lines in an image identified by the stored values of rho and theta. For this purpose, the host CPU can be a known computer such as the "Sun sparc 330" computer, available from Sun Microsystems, Inc.

A more detailed discussion of the neuro-Hough processor 36 will now be provided. The input data for the neuro-Hough processor 36 is, as mentioned above, a 15 by 15 by 1 bit data array, as shown in FIG. 2(d). Maximum meeting points in polar coordinate space for the input data received by the processor 36 are identified using a neuro-Hough transform as will be described with respect to FIGS. 3(a) to 3(e). For example, as mentioned above, the numbers shown in the FIG. 3(a) Hough transform array are obtained by overlapping curves represented by the equation:

$$rho = x \cos(theta) + y \sin(theta)$$

for every binary edge point in the x-y space of FIG. 2(d).

Because the potential values for rho in the exemplary embodiment can correspond to a value equal to the square root of 2 times 15 (i.e., the maximum distance from one outside corner to another outside corner of the FIG. 2(d) array), 19 potential values of rho were chosen. A 19×15 matrix as shown in FIG. 3(a) is therefore used to represent the Hough transform of the FIG. 2(d) data. However, because it is known in advance that few lines are likely to be present in the FIG. 2(d) array with local maximas having values of rho and theta represented by the lowermost 2 rows or the uppermost 2 rows in the FIG. 3(a) polar coordinate space, these rows can, if desired, be eliminated from further consideration. In this case, the FIG. 3(a) array can be represented as a 15 by 15 matrix. However, any size matrix may be used to represent the polar coordinates, with the size chosen reflecting the desired resolution of rho and theta.

In FIG. 3(a), the 19 values of rho can range from −9 to +9, however, only values ranging from −7 to +7 are actually considered. The 15 values of theta range from 0° to +180°. Since the horizontal x-axis in the FIG. 2(d) image is used to determine theta, angles from 180° to 360° need not be considered.

A window represented as a 3 by 3 matrix is subsequently used to detect local maxima within the Hough transform array. For example, the 3 by 3 matrices shown in FIG. 3(b) represent the detection of local maxima meeting points, the local maximas being determined by examining the center polar coordinate value of each window shown.

A plurality of these 3 by 3 matrices are shown in detail in FIG. 3(c). To detect a local maxima, the center polar coordinate value of data (e.g., the value 11 in the FIG. 3(c) window represented by a solid line) is compared with the values of the neighboring polar coordinates within that window. If the center value of the 3 by 3 matrix is higher than the value of the surrounding polar coordinates, it is considered to be a local maxima meeting point as shown in FIG. 3(d). Once the local maxima have been determined as shown in FIG. 3(d), each local maxima value is subjected to a threshold comparison to avoid detection of unsuitable local maxima values. The remaining local maximum meeting points for the entire Hough transform array are then assigned binary values of 1 in polar coordinate space as shown in FIG. 3(e).

Once a local maxima meeting point has been detected by the FIG. 3(c) window, all surrounding points within the window are assigned values of 0 as shown in FIG. 3(d). After comparison of the local maxima meeting points with localized, or adaptive thresholds, only local maximum meeting points remain in the FIG. 3(d) matrix array. These maximum points are assigned values of 1 as shown in FIG. 3(e).

Figure 4:
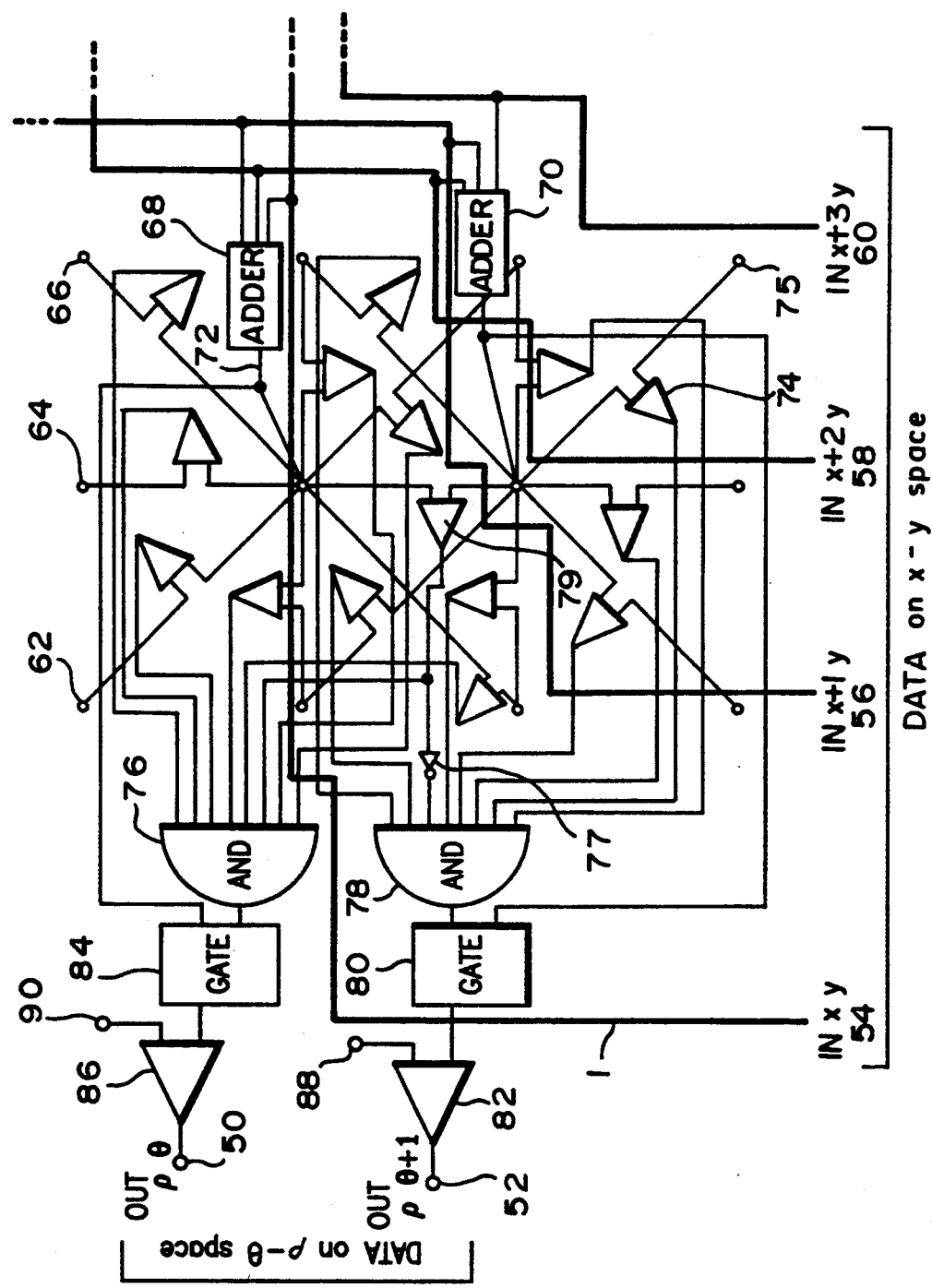
FIG. 4 shows an exemplary embodiment of a partial neuro-Hough processor.

An exemplary hardware implementation of a portion of neuro-Hough transform processor 36, as shown in the FIG. 1 system, is shown in greater detail in FIG. 4. The FIG. 4 hardware implementation thus represents a portion of a neuro-Hough processor for carrying out the detection of maximum meeting points such as those of FIG. 3(e) from the binary edge data provided by the FIG. 2(d) array for each frame of image data. The neuro-Hough transform corresponding to the FIG. 4 embodiment can be implemented as a single chip processor.

For purposes of illustration, two polar coordinate outputs 50 and 52 are shown in FIG. 4, as are four of the inputs 54, 56, 58 and 60 associated with the rectangular coordinates of the FIG. 2(d) array. Each of the inputs shown correspond to bits of binary edge data in the FIG. 2(d) array. However, it will be appreciated by those skilled in the art that to accept the binary edge data corresponding to the digitized window image of FIG. 2(d), the hardware implementation of the neuro-Hough transform processor 36 would include at least 15 by 15 input lines. Further, where local maximum meeting points of a 15 by 15 input array are to be determined by the FIG. 4 hardware implementation, 15 by 15 output lines corresponding to the polar coordinate space of FIG. 3 are provided.

Each of the input lines 54 to 60 receives a bit of data, or pixel value, from the FIG. 2(d) binary edge data array. The FIG. 4 hardware implementation further includes a series of nodes 62, 64 and 66 representing the polar coordinate data which is produced by a series of adders, including adders 68 and 70. Each of these adders thus corresponds to a set of polar coordinates in the FIG. 3(a) Hough transform array. Each adder calculates the number of curves corresponding to the points in the (x,y) space of the FIG. 2(d) array which overlap at the polar coordinate value associated with that adder, respectively. The adder outputs thus provide the values of the Hough transform array shown in FIG. 3(a).

Two of the aforementioned adders 68 and 70 are shown in FIG. 4 for adding the digital data received from predetermined rectangular coordinate input lines associated with respective pixel locations in the FIG. 2(d) array. The polar coordinate values of curves which are associated with the transformed binary edge data of given rectangular coordinates are determined in advance.

More particularly, prior to implementing the FIG. 4 neuro-Hough processor, the polar coordinate values of the FIG. 3(a) Hough transform array which are affected by the presence of a "1" in each pixel location of the FIG. 2(d) array can be numerically determined. For example, the aforementioned Hough transform equation could be solved for each pixel location of the FIG. 2(d) binary edge data array. Each adder of FIG. 4 is then hardwired to receive an input from every (x, y) pixel location in the FIG. 2(d) array having a Hough transform curve which includes the polar coordinate values associated with that adder. For example, the adder 68 receives values from at least the three input lines 54, 56 and 58, and provides an output corresponding to the sum of those inputs which are associated with edge data in the FIG. 2(d) array.

A plurality of comparators such as comparator 74 are further provided in the FIG. 4 neuro-Hough processor implementation. These comparators are provided for comparing the values of each adder output with, for example, eight adder output values corresponding to surrounding polar coordinate values in the FIG. 3(a) array. Some of the polar coordinate locations such as those in the outermost row or column of the FIG. 3(a) array will not have eight surrounding values in which case less than eight values are considered.

For example, the comparator 74 compares the value of polar coordinate data from the output of adder 70 with an adder output present at the node 75. If the input value to the comparator 74 from node 75 is higher than the value of the output of the adder 70, then the comparator 74 produces a low output. If, however, the input value from node 75 is lower than the output value of the adder 70, then comparator 74 produces a high output. The comparators connected to the adder outputs are grouped to form windows such as those shown in FIGS. 3(b) and 3(c). If the outputs of all comparators associated with the data contained in a given window are high, then the center polar coordinate value of the window is considered to represent a local maxima.

A local maxima is detected by routing all of the comparator outputs associated with a given window to an AND gate, such as the AND gate 78. A further AND gate 76 as shown in FIG. 4 is associated with another 3 by 3 window array. The adders and comparators as shown in the exemplary FIG. 4 embodiment are analog devices which provide digital voltage level outputs to the AND gate.

If, for example, all of the comparator outputs which are connected to the AND gate 78 are high such that the center polar coordinate value of that window corresponds to a local maxima, the output of the AND gate 78 will become high. Otherwise, the output of the AND gate 78 remains low. Inverters, such as inverter 77, are also provided to reduce the circuitry required in the Hough transform implementation. For example, the output of the adders 70 and 72 are connected to a comparator 79 such that comparator 79 will produce a high when the output of adder 72 exceeds that of adder 70. However, should the output of adder 70 exceed that of adder 72, the resulting low output can be used to input a high signal to AND gate 78 via inverter 77. This avoids the necessity of providing two separate comparators for comparing the outputs of the adders 70 and 72.

As described herein, the comparators which receive the adder outputs produce a high output only when one of the inputs exceeds the other input. However, the invention is not limited to such an arrangement. For example, the comparators can be designed to produce a high output when the inputs are equal.

Should the AND gate 78 output go high, then a gate 80 is enabled to pass the adder 70 output to an output of gate 80. For example, with the window of FIG. 3(c), a value of 11 would be passed through the gate 80 to a threshold comparator 82. A similar gate 84 is provided with respect to the threshold comparator 86. The outputs of the gates 80 and 84 thus provide the array of local maxima meeting points as shown in FIG. 3(d).

The threshold comparators 82 and 86 compare data outputs from the gates 80 and 84 with threshold levels input on nodes 88 and 90, respectively. If the data input to the threshold comparator from the gate is higher than the respective threshold level, the threshold comparator output becomes high. Otherwise, the output of the threshold comparator remains low. The threshold comparators 82 and 86 improve the accuracy with which local maximum meeting points are detected from the local maxima meeting points. Because outputs of the threshold comparators represent the local maximum meeting points, they can be represented as binary values of "1" and "0". Maximum meeting points as output by threshold comparators for the FIG. 3(d) array are shown in FIG. 3(e).

The threshold values input on the nodes 88 and 90 can be determined by taking the Hough transform from a portion of an image which corresponds to a totally black image as shown, for example, in FIG. 5(a). The 15 by 19 Hough transform array for the data of FIG. 5(a) is shown in FIG. 5(b).

The FIG. 5(b) Hough transform array is then modified as a result of trial and error to permit a determination of threshold values which will more accurately detect suitable maximum meeting points. For example, values of 4 in the FIG. 5(b) array are converted to a value of 5 so that a larger threshold value will be associated with these polar coordinate locations. Further, to avoid random noise from being detected as a local maxima, any threshold value lower than a value of 2 is rounded off to a value of 2.

Figure 5C:
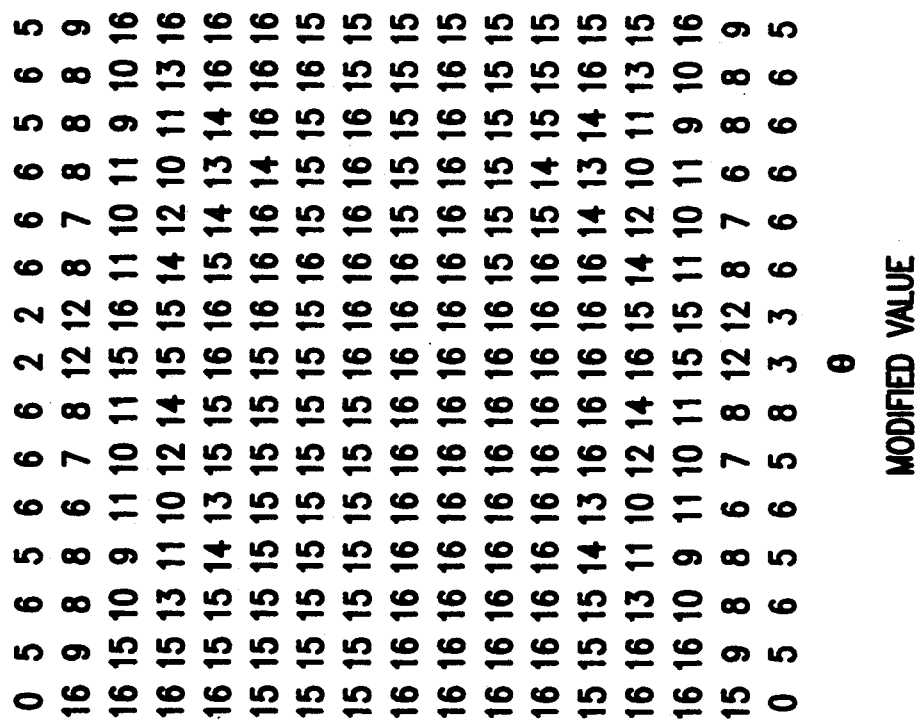

In addition, all values of the FIG. 5(b) array greater than 15 are rounded off to 15. A maximum value of 15 is selected to correspond with the number of columns in the rectangular coordinate space of FIG. 2(d) and the polar coordinate space of FIG. 3(a). As mentioned previously, a straight line in the (x, y) rectangular coordinate space of FIG. 2(d) should ideally be represented by 15 curves in the polar coordinate space which overlap, or concentrate, at a single set of polar coordinates in FIG. 5(b). Further, the 15 by 19 array of FIG. 5(b) can be reduced to a 15 by 15 array in FIG. 5(c) since, as mentioned previously, the uppermost and lowermost two rows of the FIG. 5(b) polar coordinate space need not be considered.

To obtain the threshold values, the values associated with the various polar coordinate locations in the FIG. 5(c) Hough transform array are multiplied by a threshold coefficient in the range of 0 to 1 (e.g., 0.4). In order for an output of a gate, such as the gates 80 and 84 to qualify as a local maximum meeting point, the value output from the gate must be greater than the threshold.

As described above, each of the 15 by 15 outputs, including the outputs 50 and 52, of the FIG. 4 neuro-Hough transform implementation correspond to a given set of polar coordinates. Accordingly, the presence of a high signal at one of these outputs indicates the existence of a maximum meeting point at the polar coordinate location associated with that output. Accordingly, a look-up table correlating the outputs of the neuro-Hough processor to a given set of polar coordinates can be included with the host CPU such that only the polar coordinates associated with a digitized image maximum meeting point need to be stored. As mentioned previously, the polar coordinates of a maximum meeting point can be stored in an exemplary embodiment as a 20 bit value.

Figure 6:
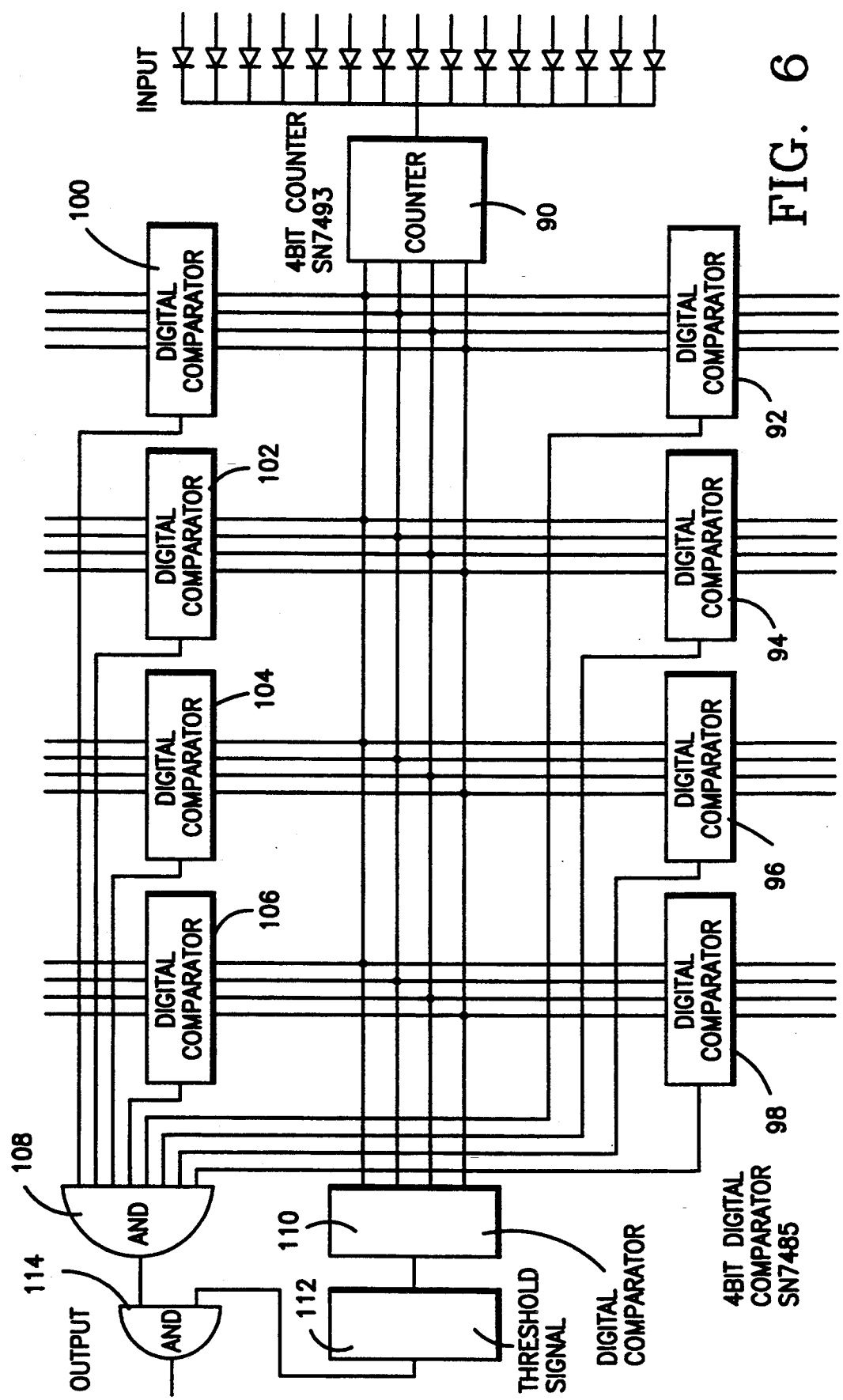

FIG. 6 represents another exemplary embodiment of a portion of a neuro-Hough processor wherein the analog adders and comparators of FIG. 4 have been replaced by counters and digital comparators. More particularly, a counter 90 is shown and is associated with a given polar coordinate location in the FIG. 3(a) Hough transform array. The counter 90 receives inputs from those (x,y) locations in the FIG. 2(d) binary edge window which have been determined in advance to have a Hough transform curve that includes the polar coordinates associated with those of the counter 90. The counter 90 thus provides a 4 bit output corresponding to the number of (x, y) coordinate values which are both associated with edge data and which have a Hough transform curve which includes the polar coordinates associated with counter 90.

The output of the counter 90, which represents one of the values shown in the FIG. 3(a) Hough transform array, is then subjected to local maxima detection. For example, each counter output is compared with eight surrounding values as described previously. The comparators 92, 94, 96, 98, 102, 104 and 106 as shown in FIG. 6 thus represent a window as shown in FIG. 3(c).

If the output value of the counter 90 is greater than the eight surrounding values represented by the other respective inputs to the comparators 92–106, then all of these comparators produce logic high inputs to the AND gate 108. The counter output is further compared in a threshold comparator 110 with a digital threshold value from threshold device 112 to identify maximum meeting points. The threshold value is determined in a manner similar to that described with respect to FIGS. 4 and 6.

If the counter output is both greater than the surrounding eight values within a given window and greater than the threshold from device 112, then a logic high from AND gate 114 indicates that polar coordinate value associated with the counter 90 represents a maximum meeting point. The AND gate 114 is, however, not necessary and could be eliminated if desired by routing the output from comparator 110 into the AND gate 108. As with the FIG. 4 embodiment, an exemplary array of 34 by 34 by (4-bit by 2) by n is used to represent the maximum meeting point values of rho and theta associated with each of the 15 by 15 windows of binary edge data considered for each digital image.

FIG. 7 shows another, more preferred exemplary embodiment of a portion of a neuro-Hough processor similar to that of FIG. 6. In FIG. 7, the AND gate 108 receives the output from comparator 110, thus rendering the AND gate 114 of FIG. 6 unnecessary as described previously. Further, in FIG. 7 the counter 90 is replaced by a programmable logic array 120.

The logic array 120 represents a known device which can be programmed to provide outputs corresponding to the binary output count representing the number of input lines currently possessing a digital high signal. However, the logic array is able to operate faster than the counter 90 as the need to sequentially count the number of input lines possessing a digital high signal is avoided. For example, a function table for the logic array 120 would be such that the four output lines shown would all be low (i.e., corresponding to a count of zero), when all inputs are low, and would all be high (i.e., corresponding to a digital count of 15) when all inputs are high. Thus, the logic array outputs would represent counts of 0 to 15 depending on the number of inputs which are high.

Several exemplary hardware implementations of a Hough transform have been described. It will be appreciated that other forms of a Hough transform can be implemented in accordance with the present invention. For example, hardware features described with respect to FIGS. 4 and 6 can be implemented in software if desired.

Thus, although the present invention has been fully described by way of example with reference to the accompanying drawings, it should be noted that various changes and modifications will be apparent to those skilled in the art. Therefore, unless such changes and modifications depart from the scope of the present invention, they should be construed as being included within the scope of the appended claims.

What is claimed is:

1. A device for processing an image to recognize characteristic features of the image comprising:
an image processor for identifying characteristic features of an image, said image processor adding values associated with rectangular coordinates of pixels representing a windowed partition of an image to provide plural counts, each count corresponding to a number of occurrences for each of plural polar coordinate values determined from said rectangular coordinates using a Hough transform in an array of overlapping polar coordinate values, said image processor further including:
a plurality of comparators for comparing the plural counts of said polar coordinate values with one another in parallel;
at least one logic device for logically combining outputs of said comparators to identify at least one local maxima count; and
at least one additional comparator for comparing the at least one local maxima count with an adaptive threshold to identify at least one maximum meeting point of polar coordinate values, said at least one maximum meeting point representing a characteristic feature of said image.

2. Device according to claim 1, wherein said image processor further includes a plurality of adders, each of said adders receiving parallel inputs from pixels having predetermined rectangular coordinates.

3. Device according to claim 1, wherein said image processor further includes means, responsive to said at least one logic device, for selectively gating a plurality of local maxima counts, in parallel, for said windowed partition.

4. Device according to claim 3, wherein a plurality of maximum meeting points are detected in parallel using said plurality of local maxima counts and a plurality of adaptive thresholds.

5. Device according to claim 4, wherein each adaptive threshold is independently determined for each polar coordinate location in a polar coordinate space.

6. Device according to claim 4, wherein each adaptive threshold is determined using a rectangular coordinate partition which includes values representing a totally black image.

7. Device according to claim 1, wherein said image processor further includes a plurality of analog adders to produce said plural counts.

8. Device according to claim 1, wherein said image processor further includes a plurality of digital counters to produce said plural counts.

9. Device according to claim 1, wherein an output of said at least one additional comparator corresponds to polar coordinates of a line in said image.

10. Device according to claim 1, wherein said image processor further includes at least one programmable logic array which receives parallel inputs from all pixels in said windowed partition having predetermined rectangular coordinates to produce said plural counts.

11. Device according to claim 10, wherein a plurality of maximum meeting points are detected in parallel by comparing a plurality of local maxima with a plurality of adaptive thresholds.

12. Device according to claim 11, wherein each adaptive threshold is independently determined for each polar coordinate location in a polar coordinate space.

13. Device according to claim 1, wherein said image processor is implemented as a single chip integrated circuit.

14. A device according to claim 1, wherein said windowed partition is a fifteen pixel by fifteen pixel window.

15. A device according to claim 1, further including:
means for storing polar coordinates which correspond to said at least one maximum meeting point as a representation of said image for providing a vehicle guidance control signal.

16. An image processing system for processing an image to recognize characteristic features of an image, said image processing system comprising:
an imaging device for generating image data;
a frame buffer for receiving frames of analog image data from the imaging device at a data acquiring rate;
an analog-to-digital converter for converting said frames of analog image data into digitized image frames, said digitized image frames having a plurality of pixel values; and
an image processor for transforming rectangular coordinates associated with each of said pixel values in a rectangular coordinate space window into polar coordinate space coordinates using a Hough transform, and for detecting and processing a plurality of local maxima meeting points of said polar space coordinates in parallel at said data acquiring rate to detect at least one maximum meeting point using at least one adaptive threshold, each of said local maxima meeting points corresponding to a number of occurrences of a polar coordinate set associated with said transformed rectangular coordinates and being used to detect said at least one maximum meeting point as a characteristic feature for portions of a digitized image frame which have been selected using said rectangular coordinate space window.

17. System according to claim 16, wherein an adaptive threshold is independently determined for each polar coordinate location in said polar coordinate space.

18. System according to claim 16, wherein said image processor is formed as a single chip processor.

19. System according to claim 16, wherein said image processor uses a plurality of windows in polar coordinate space to determine said plurality of local maxima meeting points of said rectangular coordinate space window in parallel.

20. System according to claim 19, wherein each of said plurality of polar coordinate space windows is a 3 by 3 pixel array, and is used to examine data obtained from said rectangular coordinate space window in parallel.

21. A system according to claim 15, further including:
means for storing polar coordinates which correspond to said at least one maximum meeting point as a representation of said image for providing a vehicle guidance control signal.

22. A method for processing image data to recognize characteristic features of an image for vehicle guidance, comprising the steps of:
processing the image data in an image processor to identify characteristic features of the image, said step of processing including the steps of:
adding values associated with rectangular coordinates of pixels representing a windowed partition of the image to provide a count of a number of occurrences for each of plural polar coordinate values in an array of overlapping polar coordinate values;
comparing said counts of said polar coordinate values with one another in parallel;
logically combining results of said comparing step to identify a plurality of local maxima meeting points of said polar coordinate values; and
comparing the logically combined results of the comparing step with at least one predetermined threshold to detect and output at least one of said counts as at least one maximum meeting point of said polar coordinate values, said at least one maximum meeting point being output as a characteristic feature of said image and a vehicle guidance control signal which guides a vehicle.

23. Method according to claim 22, wherein said step of logically combining uses plural polar coordinate space windows to determine local maxima meeting points from which said at least one maximum meeting point is selected.

24. Method according to claim 23, wherein said polar coordinate space windows are used to determine local maxima meeting points in parallel for portions of a digitized image frame which had been selected using said windowed partition.

25. Method according to claim 22, wherein said step of logically combining uses a polar coordinate space window formed as a 3 by 3 pixel array to examine data obtained from said windowed partition.

26. Method according to claim 22, further including a step of:
storing polar coordinates which correspond to said at least one maximum meeting point as a representation of said image and as said vehicle guidance control signal.

27. Method according to claim 22, wherein said step of logically combining is performed by a single chip processor.

28. A method for processing image data to recognize characteristic features of an image for vehicle guidance comprising the steps of:
generating the image data using an image device;
acquiring frames of analog image data from said image device at a data acquiring rate;
converting said frames of analog image data into digitized image frames, said digitized image frames having a plurality of pixel values; and
transforming rectangular coordinates associated with each of said pixel values in a rectangular coordinate space window into polar coordinate space coordinates using a Hough transform, and using a plurality of polar coordinate space windows formed as 3 by 3 pixel arrays to examine data obtained from said rectangular space window in an image processor and to detect and output at least one maximum meeting point at said data acquiring rate, said at least one maximum meeting point corresponding to a number of occurrences of a polar coordinate set associated with said rectangular coordinate space window, and being output as a characteristic feature of said image and a vehicle guidance control signal which guides a vehicle.

29. Method according to claim 28, wherein said step of transforming and detecting is performed by a single chip processor.

30. Method according to claim 28, wherein said step of transforming and detecting uses said plurality of said polar coordinate space windows to determine local maxima meeting points from which said at least one maximum meeting point is selected.

31. Method according to claim 30, wherein said polar coordinate space windows are used to determine local maxima meeting points in parallel for portions of a digitized image frame which had been selected using said rectangular coordinate space window.

32. A method according to claim 28, further including a step of:

storing polar coordinates which correspond to said at least one maximum meeting point as a representation of said image and as said vehicle guidance control signal.

* * * * *

UNITED STATES PATENT AND TRADEMARK OFFICE
CERTIFICATE OF CORRECTION

PATENT NO. : 5,430,810
DATED : July 4, 1995
INVENTOR(S) : Takao SAEKI

It is certified that error appears in the above-indentified patent and that said Letters Patent is hereby corrected as shown below:

On title page,
    item [73], delete "Imra America, Inc." and insert -- IMRA America, Inc. --.

Signed and Sealed this

Twenty-ninth Day of August, 1995

BRUCE LEHMAN

Attest:

Attesting Officer      Commissioner of Patents and Trademarks